E. S. COLE.
FLOW METER AND RECORDER.
APPLICATION FILED NOV. 21, 1913.

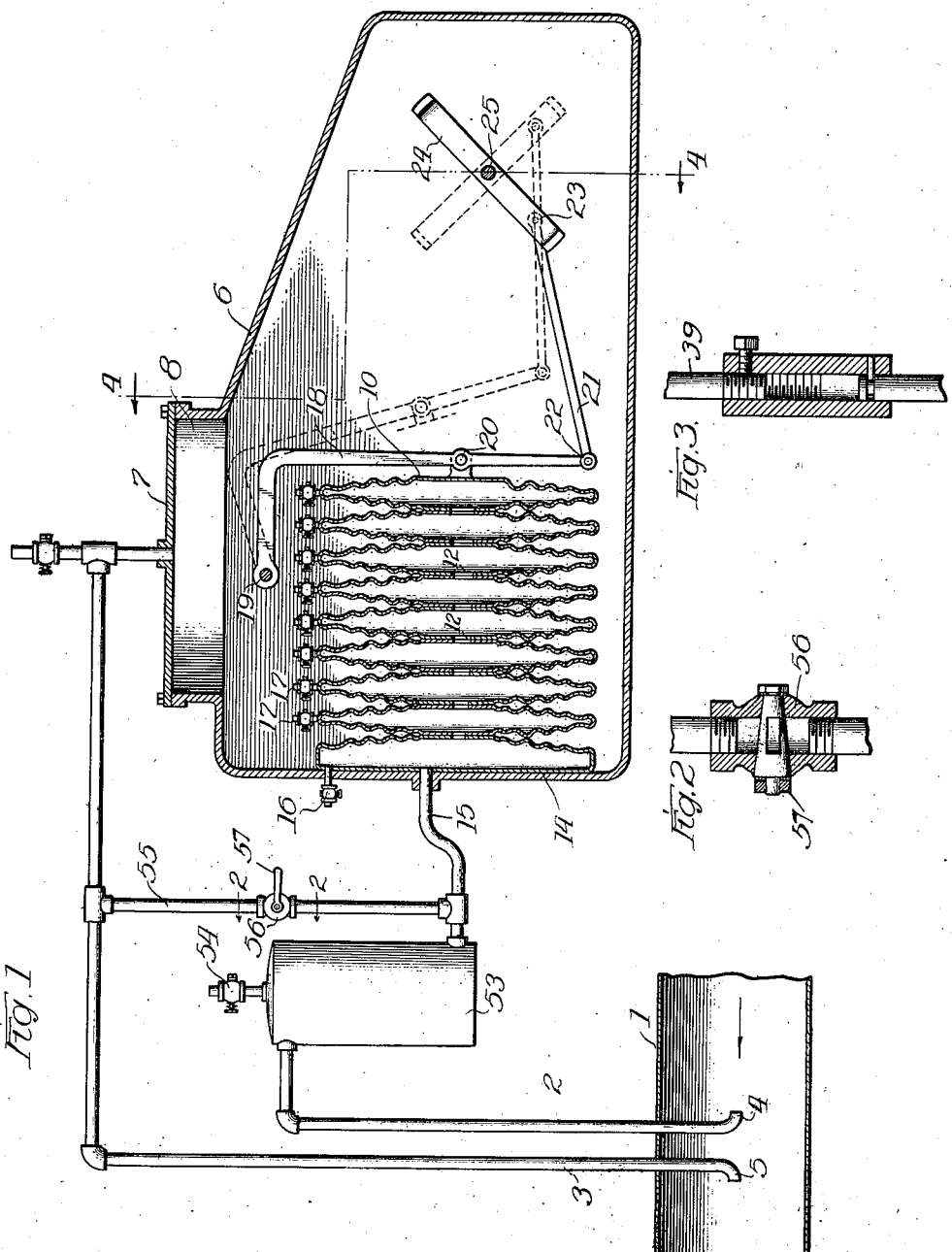

1,185,609.

Patented May 30, 1916.
3 SHEETS—SHEET 2.

Witnesses:

Inventor
Edward S. Cole
By _____ Atty

E. S. COLE.
FLOW METER AND RECORDER.
APPLICATION FILED NOV. 21, 1913.
1,185,609.
Patented May 30, 1916.
3 SHEETS—SHEET 3.
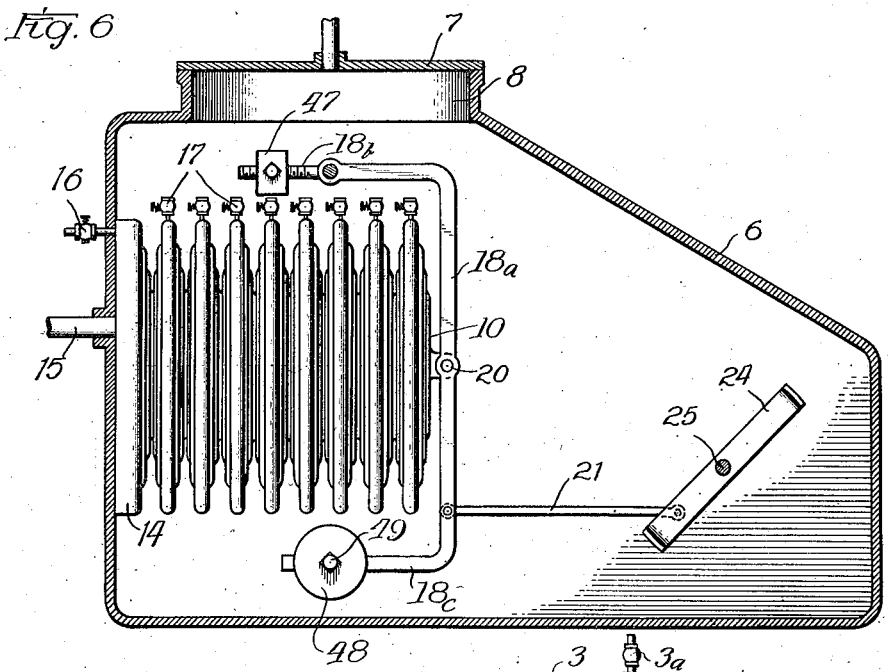
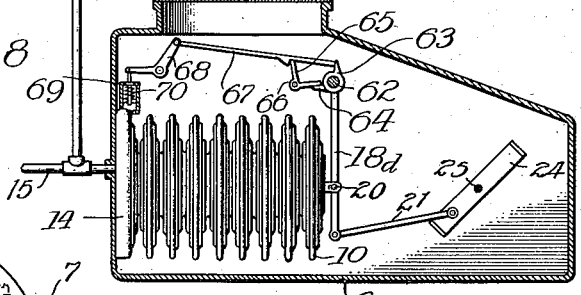
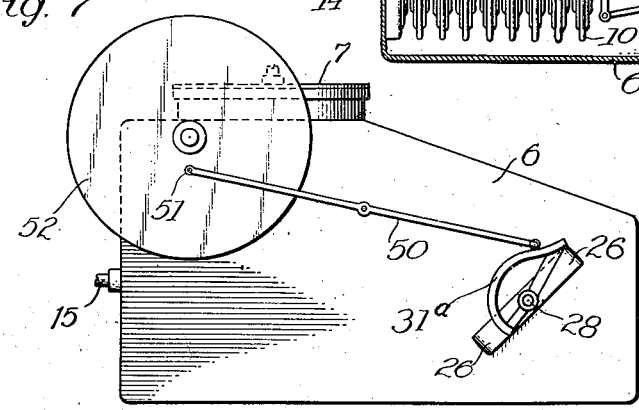
Witnesses:
Inventor
Edward S. Cole
By

UNITED STATES PATENT OFFICE.

EDWARD S. COLE, OF NEW YORK, N. Y.

FLOW METER AND RECORDER.

1,185,609.  Specification of Letters Patent.  Patented May 30, 1916.

Application filed November 21, 1913. Serial No. 802,208.

*To all whom it may concern:*

Be it known that I, EDWARD S. COLE, a citizen of the United States, residing at New York city, in the county of New York and State of New York, have invented a certain new and useful Improvement in Flow Meters and Recorders, of which the following is a full, clear, concise, and exact description, reference being had to the accompanying drawings, forming a part of this specification.

My invention relates to flow meters and recorders, and especially to flow meters and recorders particularly adapted for use in connection with the flow of water in the pipes or mains of water works systems.

Prominent objects of the invention are to provide a simple and practical device of the class specified; to secure accuracy under all conditions, and especially for low velocities of flow; to avoid inaccuracies of all kinds, especially those due to friction; to secure simplicity of construction and operation; and to secure the foregoing and other desirable results in a simple and expeditious manner.

Figure 4:
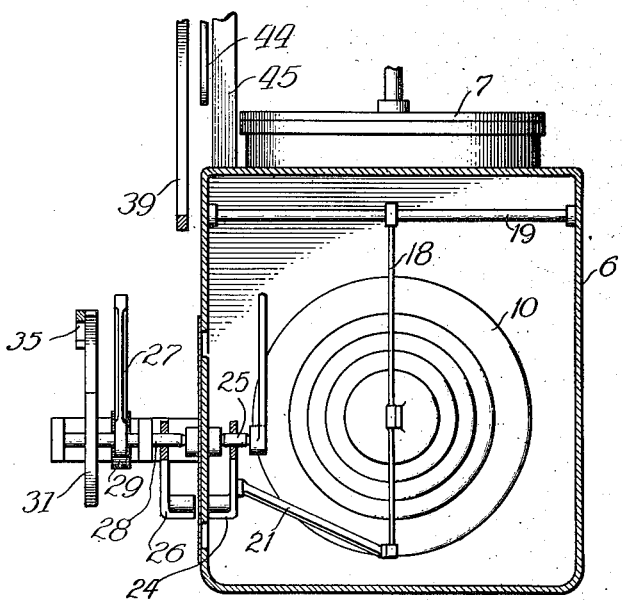
Figure 5:
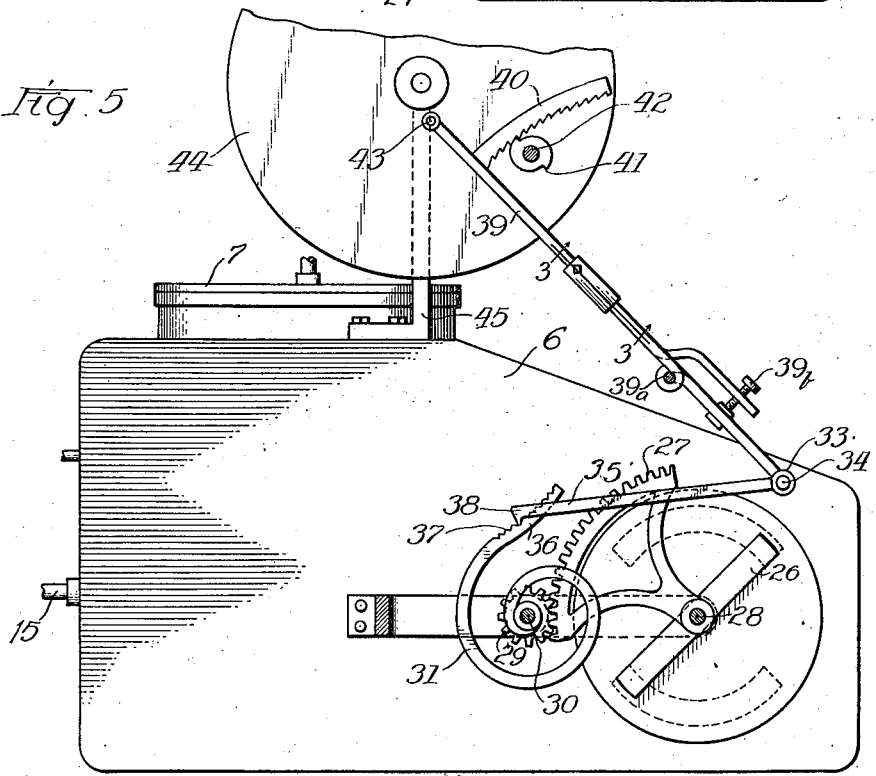

In the accompanying drawings Figure 1 is a view of a flow meter and recorder embodying my invention, together with connections of the same with a pipe or main containing a flowing stream, parts of the apparatus being shown in elevation and parts in vertical section; Figs. 2 and 3 are vertical sections taken on lines 2—2 and 3—3 in Fig. 1; Fig. 4 is a cross section taken on line 4—4 in Fig. 1; Fig. 5 is a view of one side of the apparatus; Fig. 6 is a longitudinal section of a modified form; Figs. 7 and 8 are views of still further modifications.

Referring to the drawings I show a pipe or conduit 1, in which a stream is understood to be flowing in the direction of the arrow. I also show diagrammatically a Pitot tube arrangement involving the pipes 2 and 3, which have curved ends 4 and 5 respectively which are arranged to face in opposite directions, one up stream and the other down stream. The pipes 2 and 3 run to a flow meter and recorder 6; passing through intermediate connections which will be hereinafter explained. The instrument 6 is constructed with a case or box of somewhat irregular shape, as shown in the drawings. A cover 7 is provided closing and covering an opening 8 in the top of the box 6, to permit access to the interior of the box or casing. The pipe 3 which may be called the down stream pipe, is extended to the cover 7 and connected therewith so that the down stream or static pressure of the stream in the conduit 1 is communicated to the interior of the box or casing 6. A pressure responsive device 10 is arranged within the box or casing and conveniently located more or less below the opening 8 and secured to the left hand wall of said box or casing, referring to Fig. 1. This device by preference consists of a series of expansible and contractible members or units 11—11, each comprising a bellows-like structure having flexible side plates or diaphragms provided with central apertures 12—12 so that an expansion and contraction of the device as a whole is obtained by the expansion and contraction of the individual members or units, the total expansion and contraction of the entire device being the sum of the expansion and contraction of all of the individual members or units. The member 14 secured next to the wall of the box or casing 6, has only one flexible wall, the other being preferably straight and secured to the straight wall of the box or casing. The pipe 2 leading from the up stream side of the conduit 1 is extended through the medium of other mechanism to be described hereinafter and connected with a pipe 15 which opens into the interior of the member 14, and thence communicates with the interior of the members 11—11 through the apertures 12—12 whereby the up stream or flow pressure in the conduit 1 is communicated to the interior of the pressure responsive device 10. A blow-off valve 16 is preferably secured to the casing and placed in communication with the interior of the member 14, whereby the air in said member may be blown off at any time through the valve 16. Other blow-off valves 17—17 are preferably secured to the tops of the units 11—11, whereby the air in said units may be blown off by manipulating said valves, this of course when the device is not operating, the cover 7 having been removed.

As an arrangement for utilizing the movement of the member 10 I show a swinging lever 18 pivotally mounted at 19, and pivotally connected with the outermost member 11 at 20. To the bottom of the lever or arm 18, a link 21 is pivotally connected at 22, and this link 21 in turn is pivotally connected at 23 with a pivoted swinging member 24 in the form of a permanent magnet which is pivotally supported near the side of the case upon a pivot 25. Thus an expansion and contraction of the member 10 will bring about a rotary or swinging movement on the part of the permanent magnet 24. Outside of the case and in close proximity thereto another permanent magnet 26 balanced with the inner magnet 24 is mounted so that obviously any movement of the magnet 24 will bring about a similar movement on the part of the outer magnet 26. Means are provided for transmitting this rotary movement on the part of the outer magnet, a convenient arrangement being shown and consisting of a gear segment 27 carried by the axle or pivot 28 on which the magnet 26 is mounted. This segment 27 gears with a pinion 29 on a shaft 30, which shaft also carries a spiral member 31, so that a rotation of the shaft 28 will bring about a rotation of the shaft 30 and spiral member 31. A bell crank lever member 33 is pivoted to the case of the device by pivot 34. One arm 35 of this bell crank extends over to the spiral 31 where its end engages said spiral, the end portion 36 of said spiral preferably serrated as at 37, and the end of the arm 35 having a point 38 for purposes to be hereinafter explained. The other arm 39 of said bell crank extends up and is provided with a toothed segment 40, which is adapted to engage a toothed wheel 41, mounted on a rotary shaft 42. The shaft 42 is understood to be rotated continuously by clockwork or other suitable mechanism, so that the segment 40 is repeatedly and intermittently lifted a small distance and then allowed to fall back. The end of the arm 39 is provided with a pen or pencil 43 adapted to act upon a record disk 44, or a record sheet mounted upon said disk, said disk being conveniently supported by a standard 45 mounted on top of the case 46. Thus it will be seen that the intermittent lifting motion given the arm 39 by the toothed wheel 41 will cause a rising and falling of the pencil 43, and this motion will be varied by the position of the spiral 31, since the arm 35 will drop when the arm 39 is released by the wheel 41 an amount dependent upon the position of said spiral 31. If the spiral 31 has been rotated a small amount, the depression of the pencil 43 will not be large, but as the rotation of the spiral increases the fall of the pencil 43 upon release will obviously increase also because the arm 35 will be allowed to drop much farther. In this way a record of the velocity flow in the conduit 1 is obtained, the motion of the spiral being dependent upon the extent of rotation or swinging movement on the part of the magnet 24, and this being controlled by the movement of the lever arm 18 in accordance with the extent of expansion or contraction of the member 10. When the velocity of the flowing stream is very low there will obviously be but very little motion on the part of the member 10, and also on the part of the magnet 24 and spiral 31. This small motion will be accurately interpreted by the end portion 36 of the spiral, and by serrating said end portion 36 and providing the arm 35 with a point or tooth adapted to engage the serrations on the spiral end 36, an accuracy of motion on the part of the pencil 43 for small variations in adjustment or movement of the spiral 31 is secured and thus a very high degree of accuracy on low velocities of the flowing stream is obtained. The spiral automatically corrects the movements of the member 10 so that the record formed is direct and does not require integration. The arm 39 is preferably jointed at 39$^a$ and provided with an adjusting screw 39$^b$ by which adjustment of the pencil or marker 43 may be obtained. The pipe 2 is shown running to an air chamber 53 having a blow-off valve 54 by which air may be drawn off from the apparatus, the pipe 15 being connected to the bottom of the air chamber 53 and running thence to the casing 6 as previously described. A by-pass arrangement is shown between the pipes 3 and 15. This conveniently consists of a cross pipe 55, containing a relief valve 56, as shown in Fig. 2. This valve is arranged to open upwardly and is controlled by a handle 57.

In the arrangement shown in Fig. 6 I provide a lever arm 18$^a$ generally similar to the arm 18 of the previously described apparatus, but having its upper end provided with an extension 18$^b$ preferably screw threaded and carrying a set nut 47. Also the lower end of said arm 18$^a$ is bent laterally at 18$^c$ and provided with a weight 48 made adjustable by said screw 49 along said extension 18$^c$. In this way the weight 48 will tend to counterbalance the movement of the member 10 and this extent of counterbalancing can be varied as desired by shifting the weight 48 and the counterbalance nut 47. By such arrangement there will be but little opposition to the movement of the member 10 on low velocities, but when the velocity is greater and as it increases these counterbalancing weights will tend to oppose and limit the movement of said member 10.

In Fig. 7 I show a device constructed more simply than the preceding apparatus, and capable of being made more cheaply but not giving the high degree of accuracy on low velocities. In this arrangement I show a swinging lever 50 mounted on the outer side of the case 6, and having one of its ends directly engaging a spiral 31ᵃ, which is similar to the spiral 31, but is without the serrated end portion of the latter spiral. The spiral 31ᵃ is mounted directly on the shaft 28 which carries the magnet 26. The other end of the lever 50 is provided with a pencil 51 acting upon a record sheet or disk 52. Thus considerable mechanism is done away with making the device simpler and less expensive, but this is done at the sacrifice of accuracy on low velocities.

In the arrangement shown in Fig. 8 I show an arrangement by which a relief valve is automatically operated by the movement of the pressure responsive member 10. In this arrangement a lever 18ᵈ is connected with the member 10 which is operated in the previously described manner by the expansion and contraction of the member 10. This arm or lever 18ᵈ is provided at its upper pivoted end with a collar 62 provided with two radial projections 63 and 64. A bell crank 65 is pivotally mounted at 66 and one of its arms is located in position to be engaged by the projection 64. A push rod 67 is pivotally connected to a bell crank 68, the other arm of which is adapted to act upon a valve 69 normally held in an upper position by a spring 70. When the valve 3ᵃ is open the arm or lever 18ᵈ will be swung very materially outward and this will cause the valve 69 to be depressed sufficiently to open the port which it controls, whereupon the air in the diaphragm or pressure responsive device members rises and lifts the same and passes out through the valve 3ᵃ.

It will be understood that changes and modifications can be made without departing from the spirit of the invention.

What I claim is:

1. The combination of pressure responsive mechanism having a vibratory movement upon changes or variations in the pressure, a magnetic member, means whereby said member is mechanically actuated by the vibratory movement of said pressure responsive mechanism, and a second magnetic member magnetically actuated by said first magnetic member.

2. The combination of pressure responsive mechanism having one or more flexible elements adapted to become flexed and so to produce a vibratory movement upon changes or variations in the pressure, a magnetic member, means whereby said member is mechanically actuated by the vibratory movement of said mechanism, and a second magnetic member magnetically actuated by said first mentioned magnetic member.

3. The combination of pressure responsive mechanism, a magnetic member actuated mechanically by said mechanism, a second magnetic member actuated magnetically by said first mentioned member, one of said magnetic members being included in a casing a portion of the wall of which is interposed between said member and the other magnetic member, and recording mechanism operated by said second mentioned magnetic member.

4. The combination of a hollow pressure responsive device adapted to expand and contract upon variations in pressure of fluid within it, a magnetic member, means whereby said magnetic member is mechanically operated by the expansion and contraction of said device, and a second magnetic member magnetically actuated by said first mentioned magnetic member.

5. The combination of a hollow pressure responsive device involving a plurality of flexible diaphragm bellows-like units arranged side by side and communicating with one another, said device being expansible and contractible by variations in pressure within it, a magnetic member, mechanism for actuating said magnetic member by the expansion and contraction of said device, and a second magnetic member magnetically actuated by said first mentioned magnetic member.

6. A device of the class specified, comprising in combination, a pressure responsive device having a flexible member, a swinging arm arranged for actuation by said member, and a magnet arranged for actuation by said swinging arm.

7. A device of the class specified comprising in combination, a pressure responsive device having a flexible member, a swinging arm arranged for actuation by said member, a magnet arranged for actuation by said swinging arm, and a second magnet coöperating with said first mentioned magnet and recording means actuated by said second mentioned magnet.

8. A device of the class specified comprising in combination, case, a pressure responsive device having a flexible member arranged within said case, a swinging arm actuated by said device, a movable magnet actuated by said arm, said magnet and arm being inside of said case, and a second magnet outside of said case and arranged to be actuated by said first mentioned magnet.

9. A device of the class specified comprising in combination, a case, a pressure responsive device having a flexible member arranged within said case, a swinging arm actuated by said device, a movable magnet actuated by said arm, said magnet and arm being inside of said case, a second magnet outside of said case and arranged to be actuated by said first mentioned magnet, and mechanism actuated by said second mentioned magnet.

10. A device of the class specified comprising in combination, a case, a pressure responsive device having a flexible member arranged within said case, a swinging arm actuated by said device, a movable magnet actuated by said arm, said magnet and arm being inside of said case, a second magnet outside of said case and arranged to be actuated by said first mentioned magnet, and recording mechanism actuated by said second mentioned magnet.

11. A device of the class specified comprising in combination, a pressure responsive device having a plurality of members each of which is composed of a pair of flexible plates or diaphragms, and magnetic means arranged for mechanical actuation by one end of said pressure responsive device.

12. A device of the class specified comprising in combination, a pressure responsive device involving a plurality of bellows shaped, flexible diaphragm units, arranged side by side and communicating with one another, a swinging member connected with one end of said device, a magnetic member connected with said swinging member, a case containing all of said mechanism, and a magnetic member outside of said case and arranged to coöperate with the magnetic member inside of the same.

13. A device of the class specified comprising in combination, a pressure responsive device involving a plurality of bellows shaped, flexible diaphragm units, arranged side by side and communicating with one another, a swinging member connected with one end of said device, a magnetic member connected with said swinging member, a case containing all of said mechanism, a magnetic member outside of said case and arranged to coöperate with the magnetic member inside of the same, and recording mechanism actuated by said second mentioned magnetic member.

14. The combination of a hollow pressure responsive device involving a plurality of flexible diaphragm bellows-like units arranged side by side and communicating with one another, said device being expansible and contractible by variations in pressure within it, a magnetic member, mechanism for actuating said magnetic member by the expansion and contraction of said device, and a second magnetic member magnetically actuated by said first mentioned magnetic member, the mechanism for actuating said first mentioned magnetic member being adapted to change the expanding and contracting movement of the pressure responsive device into a swinging movement of said magnetic member.

15. The combination of pressure responsive mechanism having a vibratory movement upon changes or variations in the pressure, a magnetic member, means whereby said member is mechanically actuated by the vibratory movement of said pressure responsive mechanism, said means being adapted to translate said vibratory motion into a swinging motion on the part of said magnetic member, and a second magnetic member magnetically actuated by said first magnetic member.

16. A device of the class specified comprising a case, a pressure responsive device arranged therein and provided with flexible diaphragm members, a magnetic member also arranged within said case in combination with mechanism whereby said magnetic member is actuated by said pressure responsive device, a second magnetic member arranged outside of said case and coöperating with said first mentioned magnetic member, mechanism actuated by said second mentioned magnetic member, a conduit for a flowing stream, a pipe facing up-stream and connected with the interior of said pressure responsive device, and a pipe facing down-stream and connected with the interior of said case.

17. The combination of pressure responsive mechanism, a magnetic member actuated mechanically by said mechanism, and a second magnetic member actuated magnetically by said first mentioned member, and recording mechanism arranged for actuation by said second mentioned magnetic member.

18. The combination of a casing, a hollow expansible and contractible member mounted in said casing, means whereby varying fluid pressures may be communicated to the interior of said casing and also to the interior of said hollow member, a magnetic member located in said casing, means in said casing but outside of said hollow member whereby the expansion and contraction of said hollow member actuates said magnetic member, and a second magnetic member located outside of said casing and arranged to be actuated by said first mentioned magnetic member.

19. The combination of a casing, a hollow expansible and contractible member mounted in said casing, means whereby varying fluid pressures may be communicated to the interior of said casing and also to the interior of said hollow member, a magnetic member located in said casing, means in said casing but outside of said hollow member whereby the expansion and contraction of said hollow member actuates said magnetic member, a second magnetic member located outside of said casing and arranged to be actuated by said first mentioned magnetic member, and recording mechanism arranged to be actuated by said second mentioned magnetic member.

20. The combination of a casing, a hollow member located within said casing and expansible and contractible upon variations in fluid pressure within it, a magnetic member located within said casing, means whereby the expansion and contraction of said hollow member imparts a swinging movement to said magnetic member, and a second magnetic member located outside of said casing and arranged to be actuated magnetically of said first mentioned magnetic member.

21. The combination of a casing, a hollow member located within the casing, and composed of a plurality of expansible and contractible bellows-like units secured side by side and communicating with one another, the unit at one end being secured to one wall of the casing and the unit at the other end being free to move in a vibratory manner in accordance with variations in pressure in the casing and hollow member, a magnetic member mounted for swinging movement within the casing, means whereby the vibratory movement of the free end of the hollow member swings said magnetic member, and a second magnetic member located outside of the casing and magnetically actuated by the first magnetic member.

22. A device of the class specified comprising a spiral arranged for rotary movement, means responsive to pressure variations combined with mechanism for rotating said spiral, and a recording marking device actuated by said spiral, said marking device comprising an arm resting upon and actuated by said spiral and having its opposite end provided with a marking device, in combination with means for intermittently lifting said arm and permitting the same to drop.

23. A device of the class specified comprising a spiral arranged for rotary movement, means responsive to pressure variations combined with mechanism for rotating said spiral, and a recording marking device actuated by said spiral, said marking device comprising an arm resting upon and actuated by said spiral and having its opposite end provided with a marking device, in combination with means for intermittently lifting said arm and permitting the same to drop, said mechanism comprising a rotating toothed wheel and a toothed segment carried by said arm and coöperating with said wheel.

24. The combination of a pressure responsive device, a rotary spiral combined with means whereby said spiral is rotated by said pressure responsive device, and an arm coöperating with said spiral, said arm being provided with a point and the free end of said spiral being provided with serrations adapted to coöperate with said point.

25. The combination with a pressure responsive device and means for securing a rotary movement therefrom, a rotary spiral connected with said means to bring about rotation of said spiral, and a bell crank having one arm coöperating with said spiral, and the other arm provided with a marking device, and means for intermittently lifting said bell crank and permitting the same to drop.

26. The combination of a rotary shaft provided with a magnet 26, a gear segment 27 mounted upon said shaft, a second rotary shaft provided with a spiral 31, and also provided with a pinion meshing with said gear segment, a bell crank having one arm coöperating with said spiral and the other arm provided with a marking device, and means for intermittently lifting said bell crank and permitting the same to drop.

27. The combination of a rotary shaft provided with a magnet 26, a gear segment 27 mounted upon said shaft, a second rotary shaft provided with a spiral 31, and also provided with a pinion meshing with said gear segment, a bell crank having one arm coöperating with said spiral and the other arm provided with a marking device, and means for intermittently lifting said bell crank and permitting the same to drop, said means comprising a rotary toothed wheel and a toothed segment carried by said last mentioned arm and coöperating with said wheel.

28. A device of the class specified comprising a hollow pressure responsive device, a valve controlling communication between the exterior and interior of said device, and means whereby actuation of said device controls said valve.

29. The combination of a hollow pressure responsive device, a valve controlling communication between the exterior and interior of said device, a lever arrangement controlling said valve, and a pivoted arm actuated by said pressure responsive device and arranged to control said lever arrangement.

30. A device of the class specified comprising a case, a pressure responsive device arranged therein and provided with flexible diaphragm members, a magnetic member also arranged within said case in combination with mechanism whereby said magnetic member is actuated by said pressure responsive device, a second magnetic member arranged outside of said case, and coöperating with said first magnetic member, and mechanism actuated by said second magnetic member.

31. In a device of the class specified, the combination of a pressure responsive device, responsive to changes in fluid pressure and involving one or more flexible members which are flexed by variations in fluid pressure, and a magnetic member mechanically connected with said pressure responsive device and operated by the movements of said flexible member or members.

32. In a device of the class specified, the combination of a hollow member adapted to expand and contract upon variations in fluid pressure within it, and a magnetic member mechanically connected with said hollow member and operated by the expansion and contraction thereof.

In witness whereof, I hereunto subscribe my name this 8th day of November A. D., 1913.

EDWARD S. COLE.

Witnesses:
  GEO. SCHLEIFFARTH,
  FRED C. HORNE.